(12) United States Patent  (10) Patent No.: US 8,744,477 B2
Kim et al.  (45) Date of Patent: Jun. 3, 2014

(54) SYSTEM AND METHOD FOR LOCATING A MOBILE TERMINAL USING SECURE USER PLANE LOCATION

(75) Inventors: Joo-Young Kim, Suwon-si (KR); Wuk Kim, Gwacheon-si (KR); Eun-O Lee, Cheonan-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/503,710

(22) Filed: Aug. 14, 2006

(65) Prior Publication Data

US 2007/0037586 A1   Feb. 15, 2007

(30) Foreign Application Priority Data

Aug. 12, 2005  (KR) .................. 10-2005-0074533

(51) Int. Cl.
*H04W 24/00*       (2009.01)
(52) U.S. Cl.
USPC .............. 455/456.1; 455/456.2; 455/456.6; 455/457
(58) Field of Classification Search
USPC .................. 455/456.1, 456.2, 456.6, 457
See application file for complete search history.

(56) References Cited

U.S. PATENT DOCUMENTS

2004/0185870 A1   9/2004  Matsuda
2004/0242238 A1   12/2004 Wang et al.
2005/0043038 A1   2/2005  Maanoja et al.
2005/0250516 A1*  11/2005 Shim .......................... 455/456.1
2006/0036680 A1*  2/2006  Shim .............................. 709/203
2006/0079249 A1*  4/2006  Shim .......................... 455/456.1
2006/0099961 A1*  5/2006  Duan .......................... 455/456.2

FOREIGN PATENT DOCUMENTS

KR   10-0235170    9/1999
KR   1020010028021 4/2001

OTHER PUBLICATIONS

OMA (Open Mobile Alliance), Secure User Plane Location Architecture, Draft Version 1.0, Jun. 17, 2005.

* cited by examiner

*Primary Examiner* — Manpreet Matharu
(74) *Attorney, Agent, or Firm* — The Farrell Law Firm, P.C.

(57) ABSTRACT

Disclosed is a method for determining the location of a targeted mobile set using SUPL (Secure User Plane Location) in a wireless communications network, including sending a target set location initiation message to the targeted mobile set in response to a request message, causing a home positioning server to exchange the capacities of positioning methods with the targeted mobile set to select and store a suitable positioning method, and determining the location of the targeted mobile set by using the selected positioning method previously stored whenever the location is requested. Accordingly it is unnecessary for the targeted set to resend the target set location initiation message to the positioning server whenever repeating the location calculation for the repeated deferred service.

28 Claims, 4 Drawing Sheets

| /31 | /32 | /33 | /34 | /35 |
|---|---|---|---|---|
| MSID | CLIENT_ID | START_TIME | STOP_TIME | TLRR_EVENT |

FIG.3

| /42 | /44 |
|---|---|
| TARGET_AREA | CHANGE_AREA_STATE |

FIG.4

| /52 | /54 | /56 |
|---|---|---|
| ARRIVAL | LEAVING | STAY |

FIG.5

| /61 | /62 | /63 | /64 | /65 |
|---|---|---|---|---|
| SESSION_ID | SLP_MODE | POS_METHOD | CRITERIA | SERVICE_TYPE |

FIG.6

| ₋72 | ₋74 | ₋76 | ₋78 |
|---|---|---|---|
| TLRR_EVENT | INTERVAL | START_TIME | STOP_TIME |

FIG.7

| ₋82 | ₋84 | ₋86 |
|---|---|---|
| SESSION_ID | LOCATION_ID | SET-CAPABILITY |

FIG.8

| ₋92 | ₋94 | ₋96 |
|---|---|---|
| SESSION_ID | CLIENT_ID | POS_ESTIMATE |

FIG.9

| ₋12 | ₋14 | ₋16 |
|---|---|---|
| SESSION_ID | MS_ID | LOCATION_ID |

FIG.10

SYSTEM AND METHOD FOR LOCATING A MOBILE TERMINAL USING SECURE USER PLANE LOCATION

PRIORITY

This application claims priority under 35 U.S.C. §119 to an application entitled "Positioning System and Method Using Secure User Plane Location" filed in the Korean Intellectual Property Office on Aug. 12, 2005 and assigned Serial No. 2005-0074533, the contents of which are incorporated herein by reference.

BACKGROUND OF THE INVENTION

1. Field of the Invention

The present invention relates generally to a system for locating a mobile terminal, and more particularly to a system and method for locating a mobile terminal using SUPL (Secure User Plane Location) in a wireless communications network.

2. Description of the Related Art

In recent times, there has been an increased need for services that can provide the location information of a mobile communication set. Accordingly, it has become necessary to standardize the method of locating the mobile set using an IP (internet protocol) network by a reliable organization such as the OMA (Open Mobile Alliance Standardization).

One method of locating the mobile set that is particularly common at present is to provide auxiliary information (as of A-GPS: Assistant-Global Positioning System) for the mobile set or terminal and the positioning server. Among the various systems using such a positioning method, there has been proposed a method for locating the mobile set using the SUPL protocol.

The method for locating the mobile set using SUPL protocol provides the location information of a mobile set targeted by an SUPL agent according to a request of the SUPL agent. In this case, the SUPL location platform (SLP) reports to the service subscriber the location of the mobile set according to the change-area-type if the mobile set is positioned in the target area requested by the subscriber.

The conventional request services for locating the mobile set using SUPL are generally divided into immediate, deferred and periodic request services. The immediate request service (hereinafter immediate service) provides the location information once for a single request of the subscriber. Hence, if the subscriber requires to receive the location information of the mobile set several times, he must make multiple requests to the positioning server.

Thus, a repeated request service system has been developed as the periodic request service (hereinafter periodic service), to repeatedly provide the location information for the subscriber. The repeated request service system enables the positioning server to provide the location information repeatedly according to the criteria including duration of the service, start time, and stop time. For example, the repeated request service provides the location information calculated when the mobile set enters, leaves, or stays in the area designated by the subscriber.

In order to provide the periodic service, the mobile set and positioning server exchange the capacities of positioning methods with each other so as to select a positioning method proper for both. Meanwhile, the capacity of the positioning method does not change through the services, and therefore it can be transferred once to the positioning server. Nevertheless, the conventional method causes the mobile set and positioning server to continuously exchange the capacities of the positioning methods with each other whenever the location of the mobile set is calculated. Hence, the conventional method unnecessarily repeats the transmission of the data for the capacity of the positioning method, thereby resulting in unnecessary time consumption and an inefficient rate of radio data between the mobile set and the positioning server.

SUMMARY OF THE INVENTION

It is an object of the present invention to provide a system and method for locating a mobile set using SUPL, which enables the mobile set to transfer the capacity of the positioning method only once to the positioning server so as to prevent an unnecessary repetition of transmission of radio data when the subscriber repeatedly requests the location information of the mobile set.

It is another object of the present invention to provide a system and method for locating a mobile set using SUPL, which enables the positioning server to recognize whether a request service is immediate or periodic, in order for the capacity of the positioning method to be transferred only once to the positioning server if it is the periodic service.

According to the present invention, a system for determining a location using SUPL in a wireless communications network includes a targeted mobile set to be located, and a home-SUPL location platform (H-SLP) for sending a targeted set location initiation message (SUPL INIT) to the targeted mobile set in response to a request message from an SUPL agent for requesting the location information of the targeted mobile set, wherein the targeted mobile set exchanges the capacities of positioning methods with the H-SLP to select a positioning method for determining the location of the targeted mobile set according to the SUPL INIT, the selected positioning method being stored so as to be used whenever the targeted mobile set is to be located.

According to the present invention, a method for determining the location of a targeted mobile set using SUPL in a wireless communications network includes sending SUPL INIT to the targeted mobile set in response to a request message from an SUPL agent for requesting the location information of the targeted mobile set, causing the H-SLP to exchange the capacities of positioning methods with the targeted mobile set to select a positioning method for determining the location of the targeted mobile, the selected positioning method being stored, and determining the location of the targeted mobile set by using the selected positioning method previously stored whenever the location is requested.

BRIEF DESCRIPTION OF THE DRAWINGS

The above and other objects, features and advantages of the present invention will become more apparent from the following detailed description when taken in conjunction with the accompanying drawing in which:

FIG. 3 is a schematic diagram illustrating the structure of MLP TLRR message according to the present invention;

FIG. 4 is a diagram illustrating the structure of TLR-R_EVENT parameter according to the present invention;

FIG. 5 is a diagram illustrating the structure of CHANGE_AREA_STATE parameter according to the present invention;

FIG. 6 is a diagram illustrating the structure of SUPL_INIT message according to the present invention;

FIG. 7 is a diagram illustrating the structure of CRITERIA parameter according to the present invention;

FIG. 8 is a diagram illustrating the structure of SUPL POS INIT message according to the present invention;

FIG. 9 is a diagram illustrating the structure of SUPL DEFERRED_REPORT message according to the present invention; and FIG. 10 is a diagram for illustrating the structure of SUPL DEFERRED_START message according to the present invention.

DETAILED DESCRIPTION OF THE PREFERRED EMBODIMENT

Figure 1:
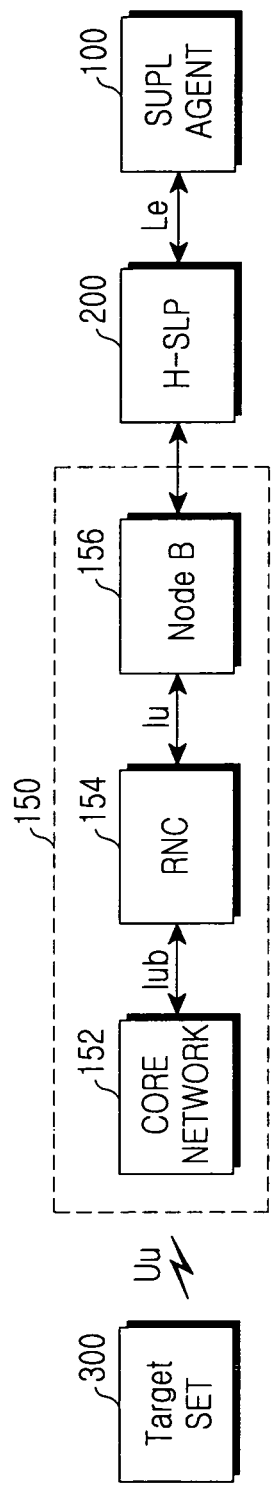
FIG. 1 is a block diagram illustrating a system for locating a mobile set using SUPL according to the present invention.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail for the sake of clarity and conciseness.

Referring to FIG. 1, the inventive system for locating a mobile set using SUPL comprises an SUPL agent 100 requesting the location information of the mobile set, a home-SUPL location platform (H-SLP) 200, a targeted mobile set 300, and a mobile communications network 150. The SUPL agent 100 is a service access pointer for accessing the H-SLP 200 supporting SUPL in order to request the location information of the mobile set. It may request the immediate or periodic service, and it sends event occurrence criteria based on the determined event occurrence, to the H-SLP 200.

The H-SLP 200 calculates the location information or value of the mobile set by using SUPL in response to a request of the SUPL-agent 100. Upon receiving the request of the location value of the mobile set from the SUPL agent 100, the H-SLP 200 inserts the parameter for representing the immediate or periodic service requested in the SUPL INIT message sent to the targeted mobile set 300 to recognize the type of the service. In addition, the H-SLP 200 sends the information of an A-GPS (Assistant Global Positioning System) and the orbital information of a satellite presently capable of being connected to the targeted set 300 to calculate its location. The H-SLP 200 also receives from the targeted set 300 the result of the determination of an event by comparing the location value of the targeted set 300 with the event occurrence criteria, which result is transferred to the SUPL agent 100.

The targeted set 300 using SUPL protocol performs the process of determining its location by exchanging the information necessary for determining the location with the H-SLP 200 using SUPL. Particularly, upon receiving the periodic service, the targeted set 300 exchanges the capacities of the positioning methods with the H-SLP 200 only once so as to select a positioning method suitable for both, which positioning method is stored for use in locating the targeted set until the requested periodic service is terminated. The method of locating the targeted set may be performed by the H-SLP 200 or by the targeted set 300.

When the H-SLP 200 locates the targeted set 300 (MS-Assisted method), the targeted set 300 sends the network information necessary for locating itself to the H-SLP 200. In this case, the network information indicates the cell information of the targeted set 300, or the information of the location area consisting of several cells. Supported by A-GPS, the targeted set 300 communicates with a satellite that can currently be connected to calculate TDOA (Time Difference of Arrival) transferred to the H-SLP 200.

Alternatively, when the targeted set 300 directly determines its location (MS-based method), it receives from the H-SLP 200 the orbital information of a satellite that can currently be connected to calculate TDOA, based on the calculated location value. Thereafter, the targeted set 300 compares the location value with the event occurrence criteria received from the H-SLP 200 to determine whether an event has occurred. If an event has occurred, the targeted set 300 reports the event to the H-SLP 200.

The mobile communications network 150 supports the radio communication between the H-SLP 200 and the targeted set 300, which may be GSM (Global System for Mobile Communication) or a UMTS (Universal Mobile Telecommunication System) network including a core network 152, RNC (Radio Network Controller) 154, and node B 156. The core network 152 managing the information of the target sets 300 performs mobility, session and call management. The RNC 154 delivers the data received from the H-SLP 200 through the node B to the core network 152 to the targeted set 300, and the data from the targeted set 300 to the H-SLP 200. The node B 156 exchanges radio signals with the targeted set 300.

As described above, the present invention enables the targeted set 300 to recognize whether the H-SLP 200 has received the immediate or periodic service. In addition, upon receiving the periodic service, the targeted set 300 and H-SLP 200 exchange the capacities of the positioning methods once with each other to select a suitable positioning method to be stored for use until termination of the service, thereby eliminating unnecessary radio exchange of the capabilities of the positioning methods.

If the SUPL agent 100 requests the H-SLP 200 to provide the deferred service of the location information of the targeted set 300, the H-SLP 200 compares the location value of the targeted set 300 with the specific criteria received from the SUPL agent 100. If the location value meets the criteria, the H-SLP 200 notifies the SUPL agent 100 of an event occurrence.

In the present embodiment, the method for locating the targeted set 300 using SUPL applies to the non-roaming case where the targeted set 300 is placed in the area controlled by the H-SLP 200. The method also applies to the network initiated case where the H-SLP 200 is requested to locate the targeted set 300 in response to a deferred service request of the SUPL agent 100. According to the present method, the targeted set 300 compares its location value with the criteria specified by the SUPL agent 100 to determine whether an event requested by the SUPL agent 100 occurs. If the event occurs, the targeted set 300 sends a message SUPL DEFERRED REPORT containing the location value to the H-SLP 200.

The H-SLP 200 inserts a service type parameter SERVICE_TYPE in the SUPL INIT message delivered to the targeted set 300 to notify which of the immediate and deferred services is started. Thus the targeted set 300 recognizes the type of location information service that has been requested based on the SERVICE_TYPE parameter.

Upon receiving a request of the deferred service of the location information, the targeted set 300 exchanges the capacities of the position methods only once with the H-SLP 200 to select a positioning method, which is stored until terminating the request of the deferred service. Thus, the targeted set 300 performs from the second time the procedure of locating its location by using the positioning method previously stored until the deferred service is terminated. Hence, the targeted set 300 no longer needs to select a positioning method for calculating its location in cooperation with the H-SLP 200. The targeted set 300 uses the SUPL DEFERRED START message without the capacity of the positioning method parameter from the second location calculation to generate the location identification LOCATION ID of its location delivered to the H-SLP 200.

Figure 2:
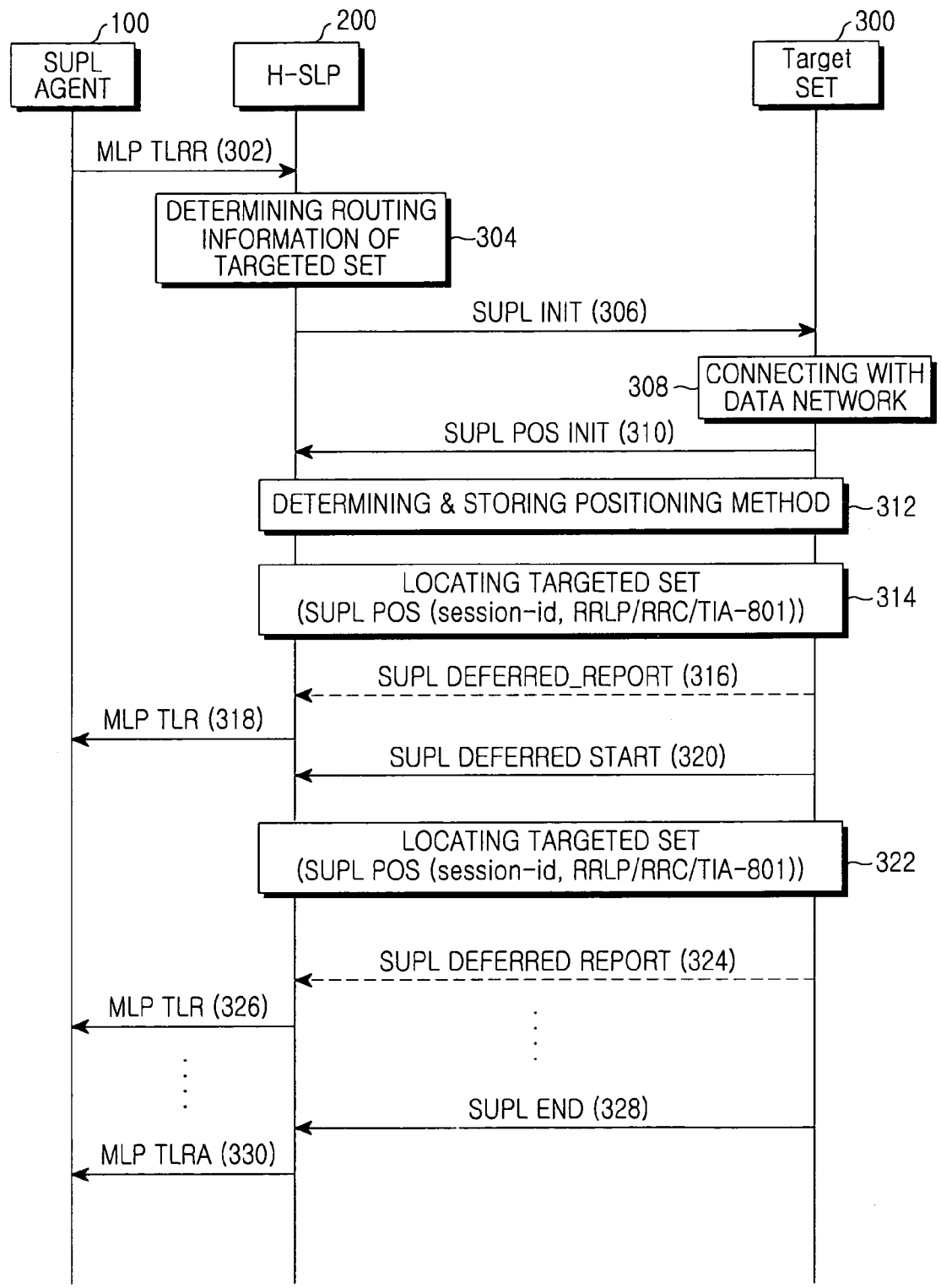
FIG. 2 is a flowchart illustrating the operation of a system for locating a mobile set using SUPL according to the present invention.

In FIG. 2, the SUPL agent 100 requests in step 302 the H-SLP 200 to provide the deferred service for locating the targeted mobile set 300 according to MLP (Mobile Location Protocol). To this end, the SUPL agent 100 sends MLP TLRR (Mobile Location Protocol Triggered Location Reporting Request) message to the H-SLP 200.

Referring to FIG. 3, the MLP TLRR message includes the parameters of MSID 31, CLIENT_ID 32, START_33, STOP_TIME 34 and TLRR_EVENT 35. The MSID 31 represents the identification of the targeted set 300. The CLIENT_ID 32 represents the identification of the SUPL agent 100. The START_TIME 33 represents the start of the service. The STOP_TIME 34 represents the end of the service. The TLRR_EVENT (Triggered Location Reporting Request Event) 35 represents the event requesting the location report.

Referring to FIG. 4, the TLRR_EVENT parameter includes TARGET_AREA 42 and CHANGE_AREA_STATE 44. The TARGET_AREA 42 represents a targeted area. The CHANGE_AREA_STATE 44 represents the state of the targeted mobile set.

Referring to FIG. 5, the CHANGE_AREA_STATE 44 includes ARRIVAL 52, LEAVING 54, and STAY 56. The ARRIVAL 52 represents the arrival of the targeted mobile set 300 to the targeted area. The LEAVING 54 represents the departure of the targeted mobile set 300 from the targeted area. The STAY 56 represents the staying of the targeted mobile set 300 in the targeted area.

Referring to FIG. 2, upon receiving the MLP TLRR message from the SUPL agent 100, the H-SLP 200 determines in step 304 whether the targeted set 300 is in roaming and uses SUPL. Herein, it is assumed that the targeted set 300 is not in roaming and uses SUPL. Thus, the H-SLP 200 sends in step 306 the SUPL INIT message to the targeted set 300 to start providing the deferred service of the location information.

Referring to FIG. 6, the SUPL INIT message includes SESSION_ID 61, SLP_MODE 62, POS METHOD 63, CRITERIA 64 and SERVICE_TYPE 65. The SESSION_ID 61 represents the identification for distinguishing the message exchanges between the H-SLP 200 and the targeted set 300. The SLP_MODE 62 represents whether the H-SLP 200 is divided into a location calculation server and a message management server. If the H-SLP 200 integrates the location calculation server and message management server, it is represented by PROXY_MODE, or otherwise by NON_PROXY_MODE. The POS METHOD (Positioning Method) 63 represents the method of locating the targeted set 300. For example, it may be used for the SERVICE_TYPE (Immediate or Deferred Service) as RRLP (Radio Resource LCS Protocol) in the GSM network, RRC (Radio Resource Control Protocol) in the wideband code division multiple access (WCDMA) network, and IS-80. The CRITERIA 64 represents the determination of whether an event occurs.

Referring to FIG. 7, the CRITERIA 64 includes TLRR-EVENT 72, INTERVAL 74, START_TIME 76 and STOP_TIME 78. The TLRR-EVENT 72 includes TARGET_AREA 42 and CHANGE_AREA_STATE 44 as shown in FIG. 4. The TARGET_AREA 42 represents the targeted area, and the CHANGE_AREA_STATE 44 represents the state of the targeted mobile set. The INTERVAL 74 represents the period of performing the positioning procedure between the H-SLP 200 and targeted set 300. The START_TIME 76 represents the start of the service. The STOP_TIME 78 represents the end of the service.

Receiving the SUPL INIT message from the H-SLP 200, the targeted set 300 checks in step 308 its connection to the packet data network, and if it has not been connected thereto, attempts to connect with the network. In this case, the targeted set 300 determines whether the SLP_MODE 62 inserted in the SUPL INIT message represents PROXY_MODE or NON_PROXY_MODE. If it represents PROXY_MODE, the targeted set 300 connects through IP to the H-SLP 200. Thereafter, the targeted set 300 sends in step 310 the SUPL INIT message to the H-SLP 200.

Referring to FIG. 8, the SUPL POS INIT message includes SESSION_ID 82, LOCATION_ID 84 and SET_CAPABILITY 86. The SESSION_ID 82 represents the identification for distinguishing the messages exchanges between the H-SLP 200 and the targeted set 300. The LOCATION_ID 84 includes the network information, cell information, NID (NETWORK_ID) and SID (SYSTEM_ID) of the present location of the targeted set 300. The SET_CAPABILITY 86 represents one of a MS-ASSISTED A-GPS and a MS-BASED A-GPS used as the positioning method, and one of RRLP, RRC and IS-801 used as the positioning protocol.

Receiving the SUPL POS INIT message from the targeted set 300, the H-SLP 200 determines in step 312 the positioning method used for locating the targeted set, which positioning method is sent to the targeted set 300 and is stored. The H-SLP 200 compares the parameter SET_CAPABILITY inserted in the SUPL POS INIT message as shown in FIG. 8 with its positioning capability so as to determine the positioning method used for locating the targeted set. The targeted set 300 also stores the positioning method received from the H-SLP 200. The positioning method stored is used until the present deferred service is terminated. Thus, it is unnecessary for the targeted set 300 and the H-SLP 200 to determine the position method again whenever the deferred service of the location information is repeated according to the STOP_TIME and INTERVAL. In this case, the targeted set 300 recognizes the requested service to be the deferred service by checking the SERVICE_TYPE inserted in the SUPL INIT, and stores the positioning method received from the H-SLP 200 in its memory to be used whenever the deferred service of the location information is repeated according to the STOP_TIME and INTERVAL.

The targeted set 300 operates a timer before starting to calculate its location in association with the H-SLP 200 after sending the SUPL POS INIT message to the H-SLP 200. If the calculation of its location is not started within the set time of the timer, the targeted set 300 sends the SUPL END message to the H-SLP 200 to terminate the session. However, if the calculation of its location is started with the set time, the targeted set 300 performs the positioning method previously stored to locate itself (SUPL POS). During this time the H-SLP 200 and the targeted set 300 exchange the necessary data with each other.

For example, if the positioning method previously stored is to allow the H-SLP 200 to calculate the location of the targeted set 300 (MS-ASSISTED A-GPS), the H-SLP 200 sends the calculated location to the targeted set 300, which in turn compares the calculated location with the event occurrence criteria contained in the SUPL INIT message so as to determine whether the event requested by the SUPL agent 100 has occurred. Alternatively, if the positioning method previously stored is to allow the targeted set 300 to calculate its own location (MS-BASED A-GPS), the targeted set 300 compares the location calculated with the event occurrence criteria contained in the SUPL INIT message so as to determine whether the event requested by the SUPL agent 100 has occurred. If the event has occurred, the targeted set 300 reports in step 316 the result 6f the event occurrence to the H-SLP 200. To this end the targeted set 300 sends the SUPL DEFERRED_REPORT message to the H-SLP 200.

Referring to FIG. 9, the SUPL DEFERRED_REPORT message includes SESSION_ID 92, CLIENT_ID 94 and POS-ESTIMATE 96. The POS-ESTIMATE 96 represents the calculated location value of the targeted set 300.

Receiving the SUPL DEFERRED_REPORT message, the H-SLP 200 reports in step 318 the event occurrence to the SUPL agent 100. To this end the H-SLP 200 may send the MLP TLR message to the SUPL agent 100, which MLP TLR message includes the parameters req_id and TRL_POS. The req_id distinguishes the request for the deferred service between the SUPL agent 100 and the H-SLP 200. The TRL_POS represents the calculated location value of the targeted set 300. Meanwhile, if the event has not occurred, the targeted set 300 does not send the SUPL DEFERRED_REPORT message to the H-SLP 200. Hence, it proceeds to step 320 without performing the steps 316 and 318. In step 320, the targeted set 300 generates the SUPL DEFERRED START message for the second location calculation by using the event occurrence criteria (CRITERIA), STOP_TIME and INTERVAL inserted in the SUPL INIT message, sending it to the H-SLP 200 to start an another positioning procedure.

Referring to FIG. 10, the SUPL DEFERRED START message includes SESSION_ID 12, MS_ID 14 and LOCATION_ID 16. In this case, the SUPL DEFERRED START message does not include the parameter SET_CAPABILITY, which differs from the SUPL POS INIT message. For the targeted set 300 and the H-SLP 200 to continue providing the deferred service through the SESSION_ID with the positioning method determined in step 312 stored in each memory, the subsequent location calculation is performed by using the stored positioning method. Namely, the targeted set 300 and the H-SLP 200 suffice for the second location calculation of step 322 with the positioning method previously stored. Consequently, the targeted set 300 does not have to resend the SET_CAPABILITY necessary for the location calculation to the H-SLP 200, so that the SUPL DEFERRED START message does not need the SET_CAPABILITY. Upon receiving the SUPL DEFERRED START message from the targeted set 300, the H-SLP 200 performs in the step 322 the procedure of locating the targeted set 300 for the second time.

For example, if the positioning method previously stored is to allow the H-SLP 200 to calculate the location of the targeted set 300 (MS-ASSISTED A-GPS), the H-SLP 200 sends the calculated location to the targeted set 300, which in turn compares the calculated location with the event occurrence criteria contained in the SUPL INIT message so as to determine whether the event requested by the SUPL agent 100 has occurred. Alternatively, if the positioning method previously stored is to allow the targeted set 300 to calculate its own location (MS-BASED A-GPS), the targeted set 300 compares the location calculated with the event occurrence criteria contained in the SUPL INIT message so as to determine whether the event requested by the SUPL agent 100 has occurred. If the event has occurred, the targeted set 300 reports in step 324 the result of the event occurrence to the H-SLP 200. To this end, the targeted set 300 sends the SUPL DEFERRED_REPORT message to the H-SLP 200.

Receiving the SUPL DEFERRED_REPORT message, the H-SLP 200 reports in step 326 the event occurrence to the SUPL agent 100. To this end, the H-SLP 200 may send the MLP TLR message to the SUPL agent 100, which MLP TLR message includes the parameters req_id and TRL_POS. The req_id distinguishes the request for the deferred service between the SUPL agent 100 and the H-SLP 200. The TRL_POS represents the calculated location value of the targeted set 300. If the event has not occurred, the targeted set 300 does not send the SUPL DEFERRED_REPORT message to the H-SLP 200. Hence, it proceeds to step 320 without performing steps 324 and 326.

Subsequently repeating the requested deferred service, the targeted set 300 arid the H-SLP 200 refer to the STOP_TIME and INTERVAL so as to determine when the deferred service is terminated. If the present deferred service is terminated with the STOP_TIME, the H-SLP 200 sends in step 328 the SUPL END message to the targeted set 300. The SUPL END message includes the SESSION_ID together with the information for notifying the targeted set 300 of the end of the location calculation. Thereafter, the H-SLP 200 sends a message MLP TLRA (Mobile Location Protocol Triggered Location Reporting Answer) to notify the SUPL agent 100 of the repeated deferred service termination. The MLP TLRA message includes the MSID, CLIENT_ID, SUPL AGENT ID and the information for notifying the termination of the repeated deferred service. When the repeated deferred service is terminated, the H-SLP 200 and the targeted set 300 release the radio resources occupied up to present, and delete the position method from each memory.

If the H-SLP 200 and the targeted set 300 determine with reference to the STOP_TIME and INTERVAL that the requested deferred service has not reached the STOP_TIME, they repeat steps 320 to 326. In this case, steps 320 and 324 are for calculating the location of the targeted set 300, and are therefore continuously repeated according to the INTERVAL during the continued repeated deferred service. However, steps 324 and 326 can be carried out only if the corresponding event has occurred.

As described above, the invention enables the positioning server to notify the targeted set of the immediate or deferred service requested so that the positioning server and targeted set exchange the capacities of the positioning methods only once with each other to select a positioning method for the deferred service, and the selected positioning method is stored to be used repeatedly until the service is terminated, thereby eliminating unnecessary transmission of the radio data.

The conventional method requires the targeted set to send the-SUPL POS INIT message containing the capability of positioning method to the positioning server whenever the positioning server and the targeted set repeat the location calculation. Further, if the SUPL POS INIT message does not contain the capability of positioning method, the positioning server treats it as an error missing the essential parameter. However, it is unnecessary in the present invention for the targeted set to resend the SUPL POS INIT message to the positioning server whenever repeating the location calculation for the repeated deferred service. Only one transmission of the capability of the positioning method is sufficient for all the subsequent calculations of the location of the targeted set in the deferred service, thereby resulting in the efficient use of the radio resources between the targeted set and positioning server. Accordingly, the invention provides a system for continuously locating a mobile set significantly improved for the use of the radio resources.

While the invention has been shown and described with reference to a certain preferred embodiment thereof, it will be understood by those skilled in the art that various changes in form and details may be made therein without departing from the spirit and scope of the invention.

What is claimed is:

1. A system for determining a location using SUPL (Secure User Plane Location), comprising:
a home location server for transmitting a location initiation message (SUPL INIT) to a targeted mobile set in response to a request message from an SUPL agent for requesting a location service of the target mobile set; and
a targeted mobile set for reporting an event occurrence to the home location server whenever an event occurs, after a positioning method is determined by using a location capability transmitted to said home location server in response to the received SUPL INIT,
wherein the home location server or the targeted mobile set performs each of a plurality of positioning procedures according to the determined positioning method during a time set by the SUPL agent and the same positioning method is used in each of the positioning procedures until the set time is arrived, and
wherein each of the plurality of positioning procedures is performed when the event of the targeted mobile set occurs.

2. A system as defined in claim 1, wherein said SUPL INIT includes service type information.

3. A system as defined in claim 2, wherein said target mobile set recognizes the requested service type from said service type information included in said SUPL INIT.

4. A system as defined in claim 2, wherein said service type information included in said SUPL INIT represents one of a location service for providing the location when the targeted mobile set enters at a specific location, a location service for providing the location when the targeted mobile set leaves a specific location, a location service for providing the location when the targeted mobile set stays in a specific location, and a location service for providing the location when a specific time period expires.

5. A system as defined in claim 4, wherein if the requested service type is one of the location service when the targeted mobile set enters, leaves or stays at a specific location, or when the specific time period is expired, the event occurrence is determined, and location service is performed using said determined positioning method until a request for deferred location service has been terminated.

6. A system as defined in claim 2, wherein said targeted mobile set sends network information required for calculating its location to said home location server to determine its location.

7. A system as defined in claim 2, wherein said targeted mobile set determines its location based on orbital information received from said home location server of a satellite capable of being contacted.

8. A system as defined in claim 2, wherein after said targeted mobile set detects an event occurrence according to event occurrence criteria included in the SUPL INIT, if the event occurs, said targeted mobile set reports the event occurrence to determine the location of said targeted mobile set.

9. A system as defined in claim 8, wherein said home location server performs the location service of said targeted mobile set according to the determined positioning method when said event occurrence is reported.

10. A system as defined in claim 1, wherein the determined positioning method is not deleted until the plurality of positioning procedures are terminated.

11. A method, of a server, for determining a location of a targeted mobile set using Secure User Plane Location (SUPL) in a wireless communications network, comprising the steps of:
receiving a request message requesting location information of the targeted mobile set, from an SUPL agent;
sending a location initiation message (SUPL INIT) to the targeted mobile set in response to the received request message from the SUPL agent;
determining a positioning method for the location service of the targeted mobile set after receiving a location capability from the targeted mobile set; and
performing each of a plurality of positioning procedures by using the determined positioning method during a time set by the SUPL agent, wherein the same positioning method is used in each of the positioning procedures until the set time is arrived,
wherein each of the plurality of the positioning procedures is performed when an event of the targeted mobile set occurs.

12. A method as defined in claim 11, wherein the SUPL INIT includes service type information for informing the requested service type to the targeted mobile set.

13. A method as defined in claim 12, wherein said service type information represents one of a location service for providing the location when the targeted mobile set enters at a specific location, a location service for providing the location when the targeted mobile set leaves the specific location, and a location service for providing the location service for providing the location when a specific time period expires.

14. A method as defined in claim 11, wherein the determined positioning method is used for performing the plurality of positioning procedures until a deferred location service has been terminated.

15. A method as defined in claim 11, wherein the home location server receives network information required for calculating a location of the targeted mobile set, and
wherein the network information is received from the target mobile set.

16. A method as defined in claim 11, wherein the home location server transmits orbital information of a satellite capable of being contacted such that the targeted mobile set calculates a location of the targeted mobile set using the orbital information.

17. A method as defined in claim 11, wherein the determined positioning method is not deleted until the plurality of positioning procedures are terminated.

18. A method as defined in claim 11, wherein the determined positioning method is stored in each home location server and the targeted mobile set when the positioning method is determined.

19. A method as defined in claim 18, wherein the home location server performs the plurality of positioning procedures by using the stored positioning method until a predetermined stop time is expired.

20. A method as defined in claim 18, wherein the home location server periodically performs the plurality of positioning procedures by using the stored positioning method.

21. A method for determining a location of a targeted mobile set using Secure User Plane Location (SUPL) in a wireless communications network, comprising the steps of:
receiving, by the targeted mobile set, a location initiation message (SUPL INIT) including event occurrence criteria from a home location server;
transmitting, by the targeted mobile set, a location capability of the targeted mobile set to the home location server;
storing, by the targeted mobile set, a positioning method determined by using the transmitted location capability of the targeted mobile set; and performing each of a plurality of positioning procedures by using the stored positioning method during a time set by a SUPL agent, wherein the same positioning method is used in each of the positioning procedures until the set time is arrived, wherein each of the plurality of the positioning procedures is performed when an event occurrence according to the event occurrence criteria is detected.

22. A method as defined in claim 21, wherein the stored positioning method is not deleted until the plurality of positioning procedures are terminated.

23. A method as defined in claim 21, wherein performing the positioning procedure further includes:

reporting an event occurrence to the home location server to calculate location of the targeted mobile set when the event occurrence according to the event occurrence criteria is detected.

24. A method as defined in claim 21, wherein performing the positioning procedure further includes:

transmitting location of the targeted mobile set calculated by using the stored positioning method to the home location server when an event occurrence according to the event occurrence criteria is detected.

25. A method as defined in claim 21, wherein performing the positioning procedure further includes:

performing the plurality of positioning procedures by using the stored positioning method until a predetermined stop time of the event occurrence criteria is expired, wherein each of the plurality of the positioning procedures is performed when the event occurrence according to the event occurrence criteria is detected.

26. A method as defined in claim 21, wherein performing the positioning procedure further includes:

performing periodically the plurality of positioning procedures by using the stored positioning method until a predetermined stop time of the event occurrence criteria is expired, wherein each of the plurality of the positioning procedures is performed when the event occurrence according to the event occurrence criteria is detected.

27. A method as defined in claim 21, wherein the SUPL INIT includes service type information, wherein the service type information represents one of a location service for providing the location when the targeted mobile set enters at a specific location, a location service for providing the location when the targeted mobile set leaves the specific location, and a location service for providing the location service for providing the location when a specific time period expires.

28. A method as defined in claim 27, wherein if the requested service type is one of the location service when the target mobile set enters, leaves or stays at a specific location, or when the specific time period is expired, the event occurrence is determined, and location service is performed using the stored positioning method until a request for deferred location service has been terminated.

* * * * *